(12) United States Patent
Sanchez et al.

(10) Patent No.: US 9,700,118 B2
(45) Date of Patent: Jul. 11, 2017

(54) UNIT FOR APPLICATION OF A COSMETIC PRODUCT

(75) Inventors: Marcel Sanchez, Aulnay Sous Bois (FR); Alain Bethune, Savigny (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 13/642,981

(22) PCT Filed: Apr. 14, 2011

(86) PCT No.: PCT/EP2011/055900
§ 371 (c)(1),
(2), (4) Date: Apr. 8, 2013

(87) PCT Pub. No.: WO2011/131554
PCT Pub. Date: Oct. 27, 2011

(65) Prior Publication Data
US 2013/0206160 A1   Aug. 15, 2013

Related U.S. Application Data

(60) Provisional application No. 61/328,754, filed on Apr. 28, 2010.

(30) Foreign Application Priority Data

Apr. 23, 2010   (FR) .................................. 10 53097

(51) Int. Cl.
*A45D 2/48*   (2006.01)
*A45D 40/00*   (2006.01)
(Continued)

(52) U.S. Cl.
CPC .............. *A45D 40/00* (2013.01); *A45D 2/48* (2013.01); *A45D 40/18* (2013.01); *A45D 40/24* (2013.01);
(Continued)

(58) Field of Classification Search
CPC .. A45D 40/26; A45D 2200/1036; A45D 2/48; A46B 11/08; A46B 2200/1053; A46B 9/02
(Continued)

(56) References Cited

U.S. PATENT DOCUMENTS 2,323,595 A   7/1943   Hanisch
4,422,986 A   12/1983   Cole
(Continued)

FOREIGN PATENT DOCUMENTS

CN   1 293 839   1/2007
EP   1 955 610   8/2008
(Continued)

OTHER PUBLICATIONS

Written Opinion of the International Searching Authority for International Application PCT/FR2011/050907 (5 pages), dated Aug. 17, 2011.
(Continued)

*Primary Examiner* — Todd E Manahan
*Assistant Examiner* — Jennifer Gill
(74) *Attorney, Agent, or Firm* — The Marbury Law Group, PLLC (57) ABSTRACT

An application unit for a cosmetic product for an applicator is disclosed. The applicator includes a region for receiving the application unit. The application unit includes a support that includes a first portion suitable for the fixing in removable fashion of the support to the reception region. The support also includes a second portion forming at least one compartment for receiving the cosmetic composition. The application unit also includes at least one cosmetic product to be applied to human keratinous substances, the compo-
(Continued)

sition of the product being different from that of the material forming the support. The cosmetic product is molded by injection onto the support.

10 Claims, 5 Drawing Sheets

(51) Int. Cl.
| | |
|---|---|
| *A45D 40/18* | (2006.01) |
| *A45D 40/24* | (2006.01) |
| *A45D 40/26* | (2006.01) |
| *B29C 45/00* | (2006.01) |
| *B29L 31/00* | (2006.01) |
| *B29C 45/16* | (2006.01) |

(52) U.S. Cl.
CPC .......... *A45D 40/26* (2013.01); *B29C 45/0003* (2013.01); *A45D 40/262* (2013.01); *A45D 2200/157* (2013.01); *B29C 45/16* (2013.01); *B29L 2031/718* (2013.01)

(58) Field of Classification Search
USPC ........ 132/108–109, 218, 320; 219/222, 229; 401/1–2; 264/255
See application file for complete search history.

(56) References Cited

U.S. PATENT DOCUMENTS

| | | | |
|---|---|---|---|
| 5,093,053 A | 3/1992 | Eckardt et al. | |
| 5,316,712 A | 5/1994 | Ono et al. | |
| 5,325,878 A * | 7/1994 | McKay | 132/116 |
| 5,794,632 A | 8/1998 | Gueret | |
| 5,803,097 A | 9/1998 | Gueret | |
| 5,881,743 A | 3/1999 | Nadel | |
| 6,343,887 B1 | 2/2002 | Dumler et al. | |
| 6,591,842 B2 | 7/2003 | Gueret | |
| 6,695,510 B1 | 2/2004 | Look et al. | |
| 7,156,885 B2 | 1/2007 | Kennedy et al. | |
| 7,390,184 B2 | 6/2008 | Keck et al. | |
| 7,481,227 B2 | 1/2009 | De Laforcade | |
| 7,637,265 B2 | 12/2009 | Funatsu et al. | |
| 7,938,128 B2 | 5/2011 | Gueret | |
| 8,336,560 B2 | 12/2012 | Dumler et al. | |
| 8,413,668 B2 * | 4/2013 | Kudo | 132/218 |
| 8,414,813 B2 | 4/2013 | Jung et al. | |
| 8,460,645 B2 | 6/2013 | Jager et al. | |
| 8,672,570 B2 * | 3/2014 | Jollet et al. | 401/2 |
| 8,752,559 B1 * | 6/2014 | Tsai | 132/108 |
| 2001/0037815 A1 | 11/2001 | Gueret | |
| 2002/0059942 A1 | 5/2002 | Neuner et al. | |
| 2002/0101005 A1 | 8/2002 | Bodmer et al. | |
| 2002/0181994 A1 | 12/2002 | Kuroiwa et al. | |
| 2003/0156885 A1 | 8/2003 | Lee | |
| 2004/0112399 A1 * | 6/2004 | Chant | 132/218 |
| 2005/0150509 A1 * | 7/2005 | Gueret | 132/217 |
| 2005/0217691 A1 | 10/2005 | Petit | |
| 2006/0070635 A1 | 4/2006 | Dumler et al. | |
| 2006/0289027 A1 | 12/2006 | Wyatt et al. | |
| 2007/0033759 A1 | 2/2007 | Dumler | |
| 2007/0034224 A1 | 2/2007 | Dumler | |
| 2007/0104531 A1 * | 5/2007 | Thiebaut | 401/68 |
| 2007/0104925 A1 | 5/2007 | Huber et al. | |
| 2007/0196306 A1 | 8/2007 | Jager et al. | |
| 2007/0256700 A1 | 11/2007 | Bodelin | |
| 2007/0286831 A1 | 12/2007 | Kamada et al. | |
| 2008/0011317 A1 | 1/2008 | Malvar et al. | |
| 2008/0023025 A1 * | 1/2008 | Burtzlaff et al. | 132/320 |
| 2008/0073968 A1 | 3/2008 | Shiina | |
| 2008/0095566 A1 | 4/2008 | Thiebaut et al. | |
| 2008/0149127 A1 | 6/2008 | Rebours | |
| 2008/0236608 A1 * | 10/2008 | Tranchant et al. | 132/218 |
| 2009/0020133 A1 * | 1/2009 | Gueret | 132/201 |
| 2009/0045089 A1 | 2/2009 | Sheppard et al. | |
| 2009/0056732 A1 * | 3/2009 | Drelinger | 132/73.6 |
| 2009/0065018 A1 | 3/2009 | Berhault | |
| 2009/0065020 A1 | 3/2009 | Butcher et al. | |
| 2009/0095317 A1 | 4/2009 | Poetschl et al. | |
| 2009/0160100 A1 | 6/2009 | Wu et al. | |
| 2009/0293900 A1 | 12/2009 | Holloway et al. | |
| 2010/0037911 A1 | 2/2010 | Kim | |
| 2010/0043817 A1 * | 2/2010 | Haan | 132/211 |
| 2010/0242984 A1 | 9/2010 | Arditty et al. | |
| 2010/0307529 A1 | 12/2010 | Schwab et al. | |
| 2011/0123248 A1 * | 5/2011 | Kim | 401/1 |
| 2011/0155162 A1 * | 6/2011 | Arditty et al. | 132/200 |
| 2012/0266910 A1 | 10/2012 | Tarling et al. | |
| 2013/0206160 A1 | 8/2013 | Sanchez et al. | |

FOREIGN PATENT DOCUMENTS

| | | |
|---|---|---|
| JP | 2005177233 | 7/2005 |
| JP | 2006115871 | 5/2006 |
| KR | 20090005369 | 6/2009 |
| WO | 9108692 A1 | 6/1991 |
| WO | 2004103676 | 12/2004 |
| WO | 2006043544 | 4/2006 |
| WO | 2006057071 | 6/2006 |
| WO | 2009062947 | 5/2009 |
| WO | 2011131907 | 10/2011 |

OTHER PUBLICATIONS

English Translation of the Written Opinion of the International Searching Authority for International Application PCT/FR2011/050907 (5 pages), dated Aug. 17, 2011.
International Search Report for International Application PCT/FR2011/050907 (6 pages), dated Aug. 17, 2011.
Written Opinion of the International Searching Authority for corresponding International Application PCT/EP2011/055900 (5 pages), dated Jun. 8, 2011.
International Search Report for corresponding International Application PCT/EP2011/055900 (3 pages), dated Jun. 8, 2011.
Final Office Action for co-pending U.S. Appl. No. 13/642,977, dated Nov. 5, 2014.
Non Final Office Action for co-pending U.S. Appl. No. 13/642,977, dated Jan. 28, 2014.
Non Final Office Action for co-pending U.S. Appl. No. 13/642,977, dated Jun. 11, 2014.
Notice of Allowance mailed Feb. 17, 2015, in U.S. Appl. No. 13/642,977.

* cited by examiner

UNIT FOR APPLICATION OF A COSMETIC PRODUCT

A subject-matter of the present invention is an application unit for an applicator of cosmetic product on human keratinous substances, in particular the eyelashes or eyebrows. The invention also relates to a process for the manufacture of the said application unit.

The term "cosmetic product" is understood to mean any composition as defined in Council Directive 93/35/EEC of 14 Jun. 1993.

Application EP 1 955 610 reveals an applicator tip composed exclusively of a composition for making up the eyelashes, moulded and capable of being fitted by push-fitting onto a heating support exhibiting a finger shape. However, such a tip composed of cosmetic product fitted directly onto the heating support sullies this support, which has to be cleaned after each use. Furthermore, in order to be able to be push-fitted onto the support, the product must necessarily extend over the entire circumference of the applicator tip. Furthermore, the handling of the tips composed solely of a makeup composition can sully the fingers of the user.

Application US 2007/0286831 reveals a mascara applicator comprising a heating part surmounted by a comb, in which the product is provided in the form of bars or beads deposited on the heating part while the latter is in a housing. Feed means comprising a piston, a cylinder or an endless screw are provided in order to convey the product onto the heating part. The product is not directly supplied with the comb but requires a complex distributor with numerous mechanical components, which may harm the reliability and/or bring about the charging of the product with undesirable particles.

Application PCT WO 2006/043544 reveals a device for application of a cosmetic product comprising a removable unit fitted to a reception region of a base facing a heating part and receiving the product in the block form to be deposited on the unit by the user and then to be melted by virtue of the heating part. However, the handling of the blocks can result in sullying of the fingers of the user.

In addition, application U.S. Pat. No. 5,316,712 reveals a process for the manufacture of a solid cosmetic product mainly obtained from a powder and an oil moulded by injection, for example, on a container, such as a dish. However, during this process, it is necessary to place the dishes beforehand in the mould, which results in an increase in the manufacturing time and a risk of poor positioning of the dishes which may be harmful to the reliability of the manufacturing process.

There exists a need to make possible the application of a cosmetic product to keratinous substances using an applicator in a way which is relatively simple, relatively reliable, hygienic and practical to use.

It is thus an object of the present invention to provide a unit for application of a cosmetic composition for an applicator in order to overcome the above-mentioned disadvantages by providing an improved application unit.

To this end, the invention provides an application unit comprising a support and a cosmetic product, the composition of which is different from that of the material forming the support, the cosmetic product being moulded by injection onto the support.

The invention advantageously makes it possible to have application units precharged with product, without intervention of the user with the product as such, which can reduce the risks of sullying or of contamination of the product. Furthermore, these application units are simple to produce industrially.

According to other characteristics of the invention, the melting point of the cosmetic product can be greater than 30° C. and lower than the melting point of the material forming the support, it being possible for the melting point of the material forming the support to be greater than 100° C.

The support can comprise at least two compartments for receiving cosmetic product separated from one another by ribs which make it possible in particular to obtain improved maintenance of the product on the support.

The ribs extend substantially transversely to the support, advantageously forming bearing regions which allow the user to more easily withdraw the support from the reception region without the fingers of the user coming into contact with the cosmetic product.

A groove can connect several compartments for receiving the composition. This groove advantageously makes it possible to feed each compartment with product while having only a single injection point.

The groove can be situated on the external face of the support or on the internal face of the support.

The number of compartments for receiving the cosmetic product can be odd. Thus, the point for injection of the cosmetic product can be in the central compartment, and the stresses applied to the support are consequently distributed symmetrically over the support.

The application unit can comprise at least two cosmetic products.

At least two successive compartments can comprise cosmetic products different from one another.

At least one compartment can comprise two different cosmetic compositions stacked one above the other.

The support can comprise two rows of compartments each comprising a different cosmetic composition.

The invention also relates to a process for producing a unit for application of a cosmetic product using a first half-mould exhibiting a first cavity and a second half-mould exhibiting a second cavity, the first cavity in combination with the second cavity defining a first injection volume for the moulding the support of the application unit, the process comprising the following stages:

- a first injection of a first material into the first injection volume is carried out in order to form the support,
- a second injection of cosmetic product into a second injection volume is carried out, the composition of the cosmetic product being different from that of the first material forming the support.

According to the invention, the second volume can be delimited by the first cavity, a third cavity of a third half-mould and the support which was not ejected from the first cavity, that is to say that the support remains in the first cavity, after the first injection.

This process advantageously makes it possible to obtain an improved output for the manufacture of the application units while ensuring good quality and good reproducibility of the charging with cosmetic product.

In this process, the injection temperature of the cosmetic composition can be lower than the injection temperature of the support.

The process can comprise a third injection of a second cosmetic composition into a third injection volume formed of the first cavity and of a fourth cavity and comprising the support charged with first cosmetic composition which was not ejected from the first cavity after the second injection.

The invention also relates to a combination comprising an applicator comprising a heating reception region and an application unit which can comprise a cosmetic product which exhibits a physical property which varies at a temperature of less than 100° C., for example at a temperature of between 30° C. and 80° C., preferably between 40° C. and 70° C.

A better understanding of the invention can be obtained on reading the following description of nonlimiting implementational examples of the latter, with reference to the appended drawings, in which:

FIG. 13a represents views an exploded view of another implementational example of the applicator, FIG. 13b represents a cross sectional view along the A-A line of the applicator of FIG. 13a, FIGS. 14 to 20 represent different alternative forms of profiles of an application unit and different schemes for charging with cosmetic product, FIG. 21 diagrammatically represents a machine which makes possible the manufacture of application units of the invention, FIGS. 29 to 34 represent alternative forms of application units not charged with cosmetic product and suitable for the support of FIG. 28.

Figure 1:
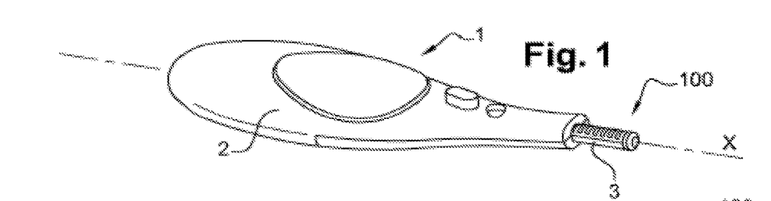
FIG. 1 diagrammatically represents an applicator comprising an application unit according to the invention.

With reference to the figures, in particular to FIG. 1, an applicator 1 according to a first implementational example comprises a base 2, extending mainly along a longitudinal axis X, and an electrical heating element 3. An application unit 100 is fitted in removable fashion to the base 2 in a reception region on the electrical heating element 3. In the example described, the reception region extends parallel to the longitudinal axis X but it might be done otherwise.

The applicator 1 comprises in particular an autonomous energy source, for example an electric battery, which makes it possible to feed the electrical heating element 3 intended to transmit its heat to the application unit 100.

The electrical heating element 3 can be produced in various ways and can comprise a resistive electrical conductor, coiled or in track form, for example one which is flexible.

Generally, the electrical heating element 3 exhibits, for example, a nominal power of between 0.5 and 2 W, for example of the order of 0.8 W, and makes it possible to achieve a temperature of greater than 50° C., for example a temperature of 70° C., for an ambient temperature of 20° C.

This electrical heating element 3 can comprise a metal covering, for example made of stainless steel or of anodized aluminium, then defining the reception region facing at least a part of the application unit 100 when the latter is fixed to the reception region.

The metal covering is, for example, substantially cylindrical, extends from the base 2 of the applicator parallel to the axis X and is configured in order to receive the application unit 100. The metal covering is, for example, open at its end distal from the base 2 of the applicator, so as to define a socket suitable for receiving a lug 36 of the application unit 100 when the latter is fitted to the reception region.

Figure 28:
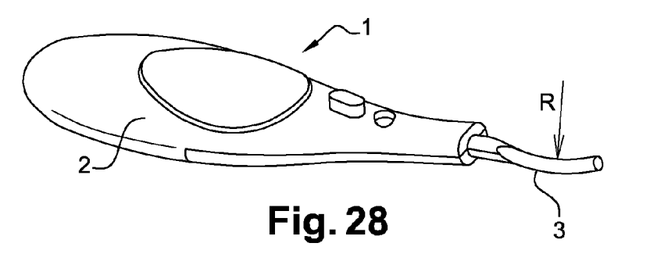
FIG. 28 represents an alternative form of the reception region of an applicator.

In an alternative form represented in FIG. 28, the region for receiving the application unit 100 extends from the base 2 of the applicator with the formation of a curved tube. The curve can be substantially circular and have a radius of curvature R of between 10 and 100 mm, advantageously between 20 and 30 mm, in order to be as appropriate as possible for the application of the product on the eyelashes, for example.

Figure 5:
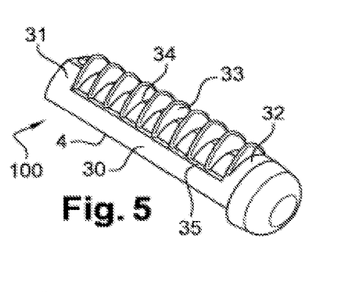
FIG. 5 is a perspective view of the application unit of FIG. 2.
Figure 6:
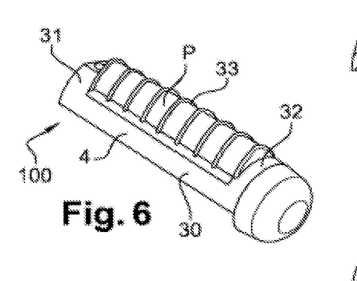
FIG. 6 is a view of the application unit of FIG. 5 charged with cosmetic product.

Application units 100 have been represented in isolation in FIGS. 2 to 6 at an intermediate stage of manufacture, devoid of product in FIGS. 2 to 5 and charged with product in FIG. 6. These application units 100 are suitable for an applicator according to the first implementational example described above but their characteristics can be adapted to applicator units suitable for other types of applicators, such as the applicator 1' described subsequently according to another implementational example.

Figures 13A, 13B:
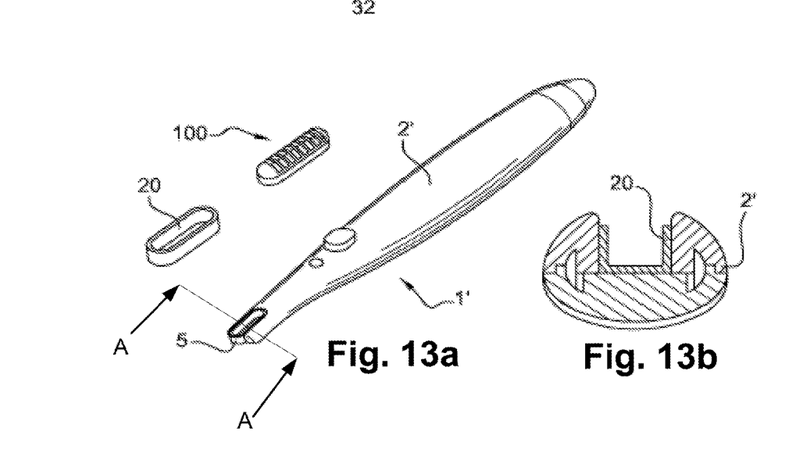
Figure 14:
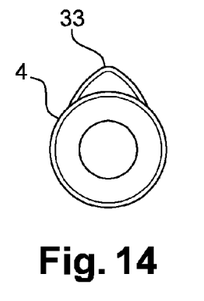

An application unit 100 comprises a support 4 suitable for the positioning of the application unit on and for the removable fixing of the application unit to the reception region of the applicator 1. In addition, the removable fixing of the support 4 to the reception region makes it possible to easily change product, the applicator 1 thus remaining clean and capable of receiving a new application unit 100. The removable fixing is carried out by snap-fastening, as illustrated in FIGS. 13a and 13b, by push-fitting, by close fitting or any other means for removable fitting, such as, for example, using a lug 36 capable of being received in a socket of the applicator, as is represented in particular in FIG. 9.

Thus, the support 4 can extend along a longitudinal axis Y which can be parallel to the longitudinal axis X of the base 2 of the applicator 1 when the application unit is fitted to the latter.

The support 4 can comprise, as illustrated, a frame comprising two side sections 30 connected to one another at their proximal and distal ends via the proximal part 31 and distal part 32 of the support 4. The frame then forms a compartment capable of receiving a cosmetic product.

Figures 7, 7A:
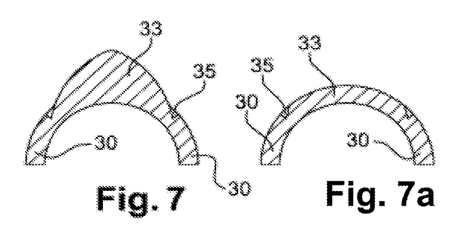
FIG. 7 is a view in transverse cross section along VII-VII of the application unit of FIG. 2 devoid of cosmetic product.
FIGS. 7a and 8a are views in transverse cross section similar to FIGS. 7 and 8 with ribs not extending radially.
Figure 9:
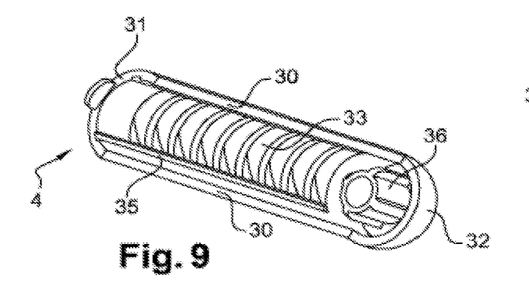
FIGS. 9 and 10 are perspective views of an alternative embodiment of the application unit respectively without and with cosmetic product.

As illustrated in FIG. 7, each of the sections 30, the proximal part 31 and the distal part 32 of the support 4 can exhibit an interior profile complementary to the reception region of the applicator and in particular to the electrical heating element 3. For example, the interior profile is in an arc, so as to fit over a cylindrical reception region. Thus, the internal face of the support 4, that is to say the face facing the heating element 3 or its metal covering, forms a shell which extends over a whole revolution or over less than one revolution about the axis Y, for example so as to form a half-cylinder. Furthermore, as illustrated in FIG. 9, a lug 36 can be provided at the distal end of the support 4, it being possible for this lug to be inserted in a socket of the reception region provided in the heating element 3, in order to hold the support 4 more exactly on the reception region.

Figure 2:
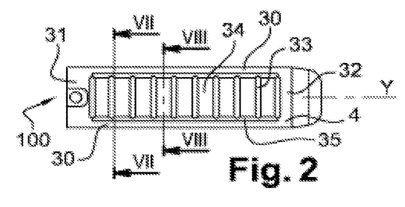
FIG. 2 is a top view of the application unit of FIG. 1 in isolation without cosmetic product.
Figure 3:
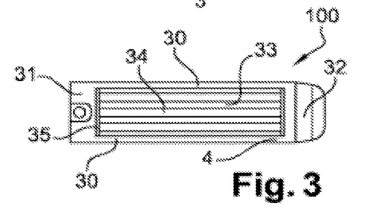
FIG. 3 is a first alternative form of the application unit of FIG. 2.
Figure 4:
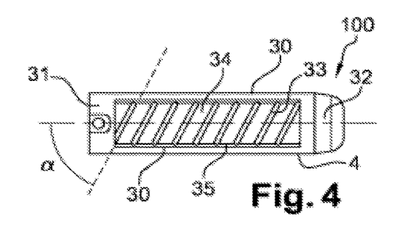
FIG. 4 is a second alternative form of the application unit of FIG. 2.

The support 4 can be configured in order to exert a combing action, in particular on the eyelashes. Thus, the support 4 can comprise ribs 33 parallel to one another. The ribs 33 can be directed transversely to the axis Y, as illustrated in FIGS. 2, 5 and 6, or otherwise, for example forming an angle α with the axis Y, for example equal to 45°, as in FIG. 4, or even directed parallel to the axis Y, as in FIG. 3. The ribs 33 may also not be parallel to one another.

The ribs 33 can connect the side sections 30 of the exterior side of the application unit 100, that is to say of the side opposite the heating element 3, when the application unit 100 is in place on the reception region. The base of the ribs 33 then exhibits a profile in an arc in the extension of the profile in an arc of the sections 30, in order to be able to be positioned in contact with the cylindrical reception region.

The ribs 33 divide the frame into a plurality of compartments 34 suitable for receiving a cosmetic product. For example, in the case of ribs 33 directed transversely to the axis Y, the support can comprise between two and fifteen ribs. The distance between two adjacent ribs is, for example, between 0.2 and 1.2 mm.

Preferably, an application unit 100 can have a greater dimension along the axis Y of less than 30 mm, indeed even of less than 20 mm. The frame is divided into an odd number of compartments; for example, a frame with a length of approximately 12 mm along the axis Y is divided into 9 compartments of approximately 1 mm along the axis Y by 8 ribs 33 transversal to the axis Y and with a thickness of less than 0.4 mm. These 8 ribs 33 can be supplemented by two outermost ribs on the proximal part 31 and distal part 32 of the support 4 in order for the first and final compartments 34 to be identical to one another.

The ribs 33 can extend radially on moving away from the support 4; for example, the ribs 33 can exhibit a height of 1 mm above the axis comprising the peaks of the proximal part 31 and distal part 32. The ribs 33 illustrated are identical in height but can also exhibit heights which vary from one end to the other of the support, in particular passing through a maximum at mid-length of the support.

The ribs 33 can also exhibit various types of profiles, for example rounded, triangular or, as illustrated, as pointed arch.

In addition, the ribs 33 can define a bearing region which allows a user to more easily withdraw the support from the reception region, for example by causing it to slide along the base, without the fingers of the user coming into contact with the cosmetic product P.

Figure 8:
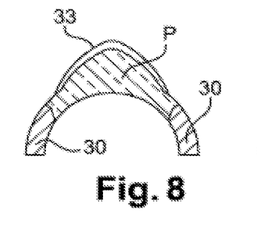
FIG. 8 is a view in transverse cross section along VIII-VIII of the application unit of FIG. 2 charged with cosmetic product.
Figure 8A:
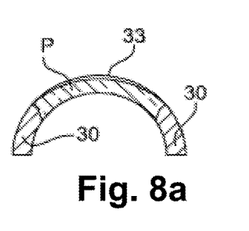

The ribs 33 may also not extend radially on moving away from the support 4, as in the example represented in FIGS. 7a and 8a.

One or more grooves 35 can connect the various compartments 34 to one another. These grooves 35 can be situated on the external face of the support 4, that is to say on the face opposite the heating element. These grooves 35 are, for example, situated along an edge of the frame, in particular along one or more sections 30, as in FIGS. 2 and 4 to 6, or along one or more of the proximal part 31 and distal part 32 of the support 4, as in FIG. 3.

Figure 10:
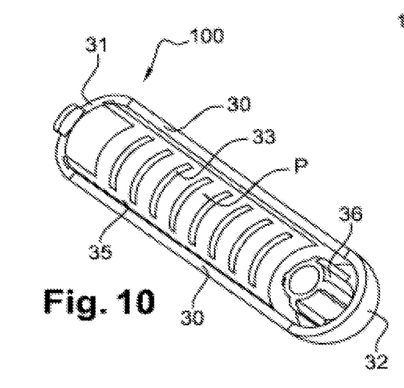
Figure 11:
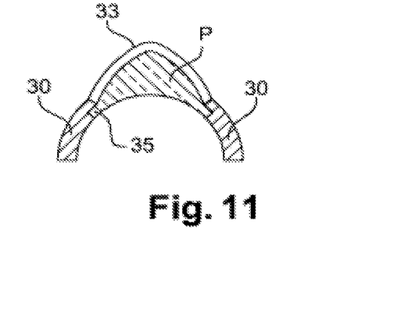
FIG. 11 is a view in transverse cross section of the application unit of FIG. 9.

According to an alternative embodiment, an application unit 100 is represented in FIGS. 9 and 10 respectively devoid of and charged with cosmetic product P. This alternative form differs from the application unit described above with reference to FIGS. 2 to 6 in that the groove or grooves 35 connecting the different compartments 34 to one another are situated on the internal face, that is to say facing the heating element 3 or its metal covering, and extend over an edge of the frame along one or more sections 30.

In all the alternative forms of the application unit 100, the groove or grooves 35 may extend only over a portion of the support, so as to connect only some successive compartments. Thus, one or more first grooves may connect the first proximal compartments of the application unit, with respect to the base 2 of the applicator, and one or more second grooves may then connect the other compartments 34.

FIGS. 29 to 34 represent alternative forms of supports 4 suitable for the curved reception region represented in FIG. 28.

Figure 29:
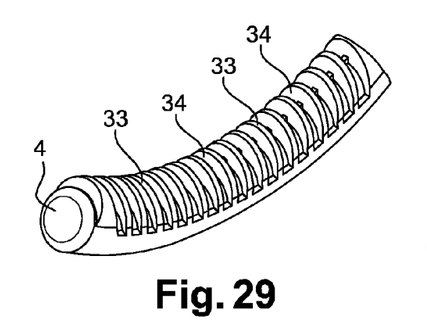

With reference to FIG. 29, the support 4 is formed of a sleeve of circular cross section which extends along an axis of elongation, the radius of curvature of which is substantially identical to that of the reception region of the applicator 1, in order to be able to be push-fitted onto this reception region. A portion of the support comprises an opening forming a frame for receiving the cosmetic product (not represented). This opening extends along the support. A bridge of material of the support 4 can longitudinally divide this opening into two parts. Ribs 33 divide the frame into a plurality of compartments 34 suitable for receiving a cosmetic product. The ribs 33 are directed transversely to the axis Y and extend radially on moving away from the support 4. The transverse cross section of the ribs 33 forms substantially a half-moon.

Figure 30:
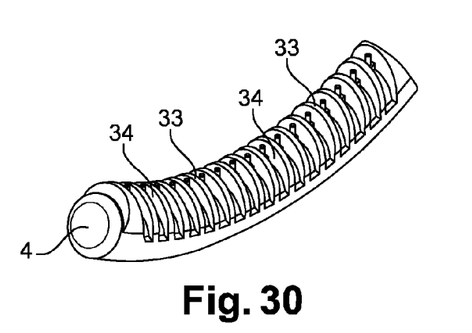

With reference to FIG. 30, the support 4 is similar to that of FIG. 29 but comprises pins extending radially from the bridge of material. A pin is positioned between each ribs 33. The height of the pins is identical to that of the ribs but it can be different. These pins make possible, for example, better maintenance of the product on the support and also make it possible to better separate the eyelashes during the application of the product.

Figure 31:
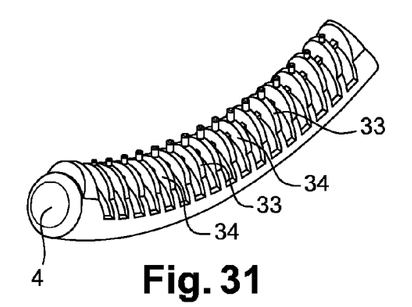

With reference to FIG. 31, the support 4 is similar to that of FIG. 29 but each rib 33 comprises at least one pin extending radially from the radial end of the rib.

Figure 32:
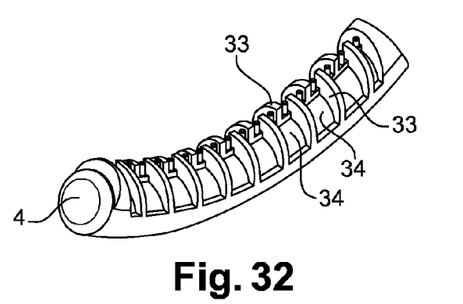
Figure 33:
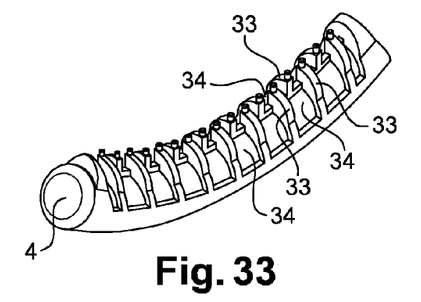

With reference to FIG. 32, the support 4 is similar to that of FIG. 29 but the ribs 33 have a transverse cross section substantially in the form of a quarter of the moon. The ribs 33 are positioned in alternating fashion on moving along the bridge of material. Thus, the ribs extending from one side of the central bridge of material alternate with the ribs extending from the other side of the bridge of material. Pins can be positioned between each rib 33, as in FIG. 32, or on the ribs, as in FIG. 33.

With reference to FIG. 34, the support 4 is similar to that of FIG. 31 but the ribs 33 as a half-moon comprise a recess at their extremum. A pin can be positioned on each rib 33 in the recess.

In the examples illustrated, the bottom of the support 4 is openwork but it can be intact according to other alternative forms. An openwork bottom makes possible direct transmission of the heat from the heating element 3 to the product P and thus a more rapid arrival at the application temperature.

The support 4 is, for example, made of plastic, in particular of a polyolefin, such as polyethylene (PE) or polypropylene (PP), or, in an alternative form, of nonpolyolefinic materials, such as styrene/acrylonitrile (SAN), acrylonitrile/butadiene/styrene (ABS) or polyoxymethylene (POM).

These plastics can optionally comprise, as fillers, inorganic particles or fibres, for example of metal oxides, of powder or fibre of glass or carbon black, in order, for example, to improve and/or control the transfer of the heat in the support 4 to the product and/or to improve the stiffness of the support 4.

In an alternative form, the support 4 can be made of metal, for example of aluminium, brass, silver or stainless steel.

The support 4 is produced by injection moulding. The injection moulding process will be described in the continuation of the description.

A description has been given of alternative forms of the support 4 comprising just one frame forming a compartment capable of receiving a cosmetic product but alternative forms of the application unit illustrated in FIGS. 17 to 20 can comprise several frames. These supports 4 can comprise the same characteristics as the preceding supports, such as, for example, can comprise ribs 33 and/or grooves 35.

Figure 17:
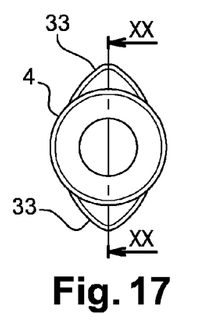
Figure 20:
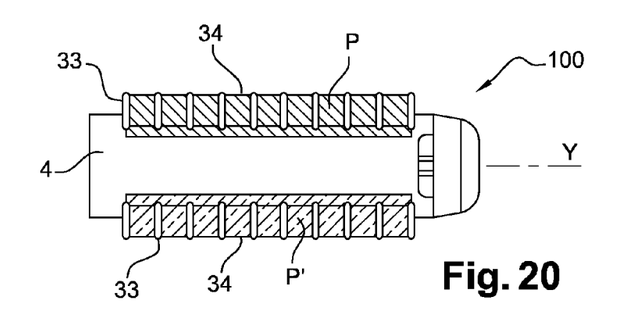

Thus, with reference to FIGS. 17 and 20, when the support 4 extends over more than one half-revolution about the axis Y, two opposite frames with respect to the axis Y may be present on the support 4.

Figure 18:
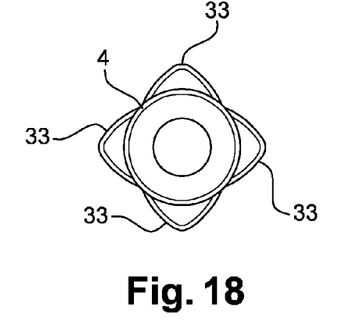

With reference to FIG. 18, the support 4 extends over one revolution about the axis Y; four frames, for example positioned every 90° with respect to the axis Y, may be present on the support 4.

Figure 19:
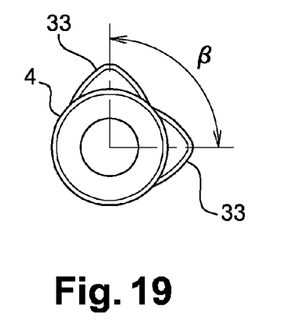

With reference to FIG. 19, the support 4 extends over less than one revolution or over one complete revolution about the axis Y; two frames offset by an angle β, for example of less than 90°, for example equal to 70°, with respect to the axis Y, may be present on the support 4.

An applicator 1' according to another implementational example, with an application unit adapted to this applicator 1', has been represented in FIG. 13a.

The application unit 100 can be received in a dish 20. The latter is, for example, made of thermoplastic but can also be metallic, in order to promote the transfer of heat from the heating element (not represented) to the application unit 100. The dish 20 can be of use in reducing the risk of flow of product out of the applicator during the heating. The dish 20 can be hollow or can comprise a closed bottom.

The dish 20 can be fixed in removable fashion to the reception region 5 of the applicator 1', in order to allow it to be removed, for example to replace it or to change the application unit. The dish 20 can also be integral with the base of the applicator. The dish 20 can also form part of the application unit 100.

The application unit 100 can be clipped into the dish 20 or can be fitted simply by flush fitting into the dish 20.

Such an applicator is suitable, for example, for applying a product to the lips or skin.

Figure 12:
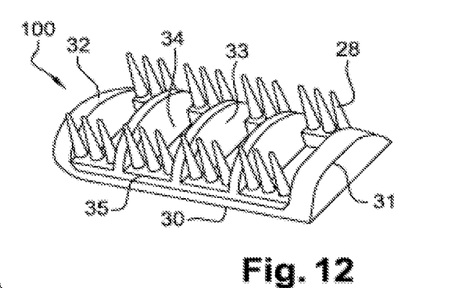
FIG. 12 is a perspective view of an alternative form of the application unit.

The support 4 can also, as represented in FIG. 12, comprise application elements 28 which project. In the case of application to the eyelashes, the application elements 28 can be of use in separating the eyelashes laden with product and can define means for combing the eyelashes.

The application elements 28 can be positioned on the sections 30 of the support 4; for example, the application elements 28 can extend along two rows parallel to the longitudinal axis Y of the support 4, each positioned on a section 30 of the support 4.

When the support 4 is made of thermoplastic, the application elements 28 can be made of a single component with the remainder of the support 4 or, in alternative form, can be added to the latter.

In the example represented, the application elements 28 are teeth extending between the ribs 33. The same number of application elements 28 is, for example, positioned between two adjacent ribs 33.

The application elements 28 can be positioned along rows parallel to the axis Y and can project above the ribs 33.

The cosmetic product P, also known as cosmetic composition, can extend, as illustrated in FIGS. 6, 7, 9 and 10, into the frame of the support 4 formed by the two side sections 30 connected to one another at their proximal and distal ends. Thus, the product P extends over less than one revolution around the axis Y of the support 4, resting via an internal face, opposite the application face, against the bottom of the support 4, which is positioned facing the electrical heating element 3 when the application unit 100 is in place on the base 2. The product P thus extends only over a portion of the metal element covering the heating element, thus preventing the whole of the surface of the metal element from being sullied.

When the support 4 comprises ribs 33, the product P does not extend above the ribs 33. Preferably, the product P is at least partially set back from the upper end of the said ribs 33, allowing a user to take the application unit 100 without her fingers coming into contact with the cosmetic product P and thus preventing the fingers from becoming sullied.

The support 4 carries, for example, between 10 and 100 mg of product, for example between 20 and 50 mg of product, for example of the order of 30 mg, this amount being, for example, suitable for a single use. When the product is, for example, of the mascara type, the amount of product makes it possible, for example, to make up a fringe or two fringes of eyelashes. The term "mascara" is understood to mean a composition intended to be applied to keratinous fibres.

The cosmetic product P is, for example, a composition for making up the eyelashes exhibiting a property which varies as a function of the temperature, for example a threading nature. The product may be applicable under cold conditions.

It is, for example, a composition comprising at least one reversible polymer which is solid at ambient temperature. The term "solid" denotes a product which does not flow under the effect of gravity at 20° C.

The composition can comprise at least one compound chosen from:
  polymers and copolymers comprising at least one alkene monomer, in particular ethylene-based copolymers,
  poly(vinyl acetate) homopolymers,
  silicone resins,
  film-forming block ethylenic polymers, which preferably comprise at least one first block and at least one second block having different glass transition temperatures (Tg), the said first and second blocks being connected to one another via an intermediate block comprising at least one constituent monomer of the first block and at least one constituent monomer of the second block,
  copolymers of dienes and of styrene,
  sulphopolyesters,
  copolymers of alkene and of vinyl acetate, in particular copolymers of ethylene and of vinyl acetate,
  copolymers of ethylene and of octene,
  poly(vinyl acetate) homopolymers,
  T silicone resins, such as polyphenylsiloxanes,
  film-forming block ethylenic copolymers resulting essentially from monomers chosen from alkyl methacrylates, alkyl acrylates and their mixtures,
  copolymers of butadiene and of styrene, copolymers obtained by condensation of diethylene glycol, cyclohexanedimethanol, isophthalic acid and sulphoisophthalic acid, and their blends.

The threading nature can in particular be of dmax≥5 mm, being determined in particular according to the protocol described in sections [0120] to [0127] of Application EP 1 955 610.

The product P is, for example, solid at 20° C. and exhibits a hot threading nature at a temperature of greater than 30° C., for example at a temperature of between 30° C. and 80° C., preferably between 40° C. and 70° C. The electrical heating element then has the role of bringing the product to a temperature sufficient to bring about the melting thereof and to make possible the formation of threads of product, in particular at the end of the eyelashes.

The product may not exhibit a hot threading nature; for example, the heating of the product may also increase the adhesion of the product to the eyelashes in order to make it easier to obtain a deposited layer having greater gloss or may also make possible the use of compounds which are not suitable for cold application.

The product can exhibit a melting point of greater than or equal to 50° C., for example in the vicinity of 54° C.

The product is, for example, chosen in order to be able to be heated several times at a temperature of at least 90° C., without being damaged.

The product described in this example is of the mascara type, for application to the eyelashes, but, in an alternative form, the product can be intended for application to the lips or nails or can also be a product for making up the skin, for example a foundation; in these other applications, the support 4 may then not comprise ribs 33.

The product P is charged to the support 4 by injection moulding. The injection moulding process will be described in the continuation of the description.

Figure 15:
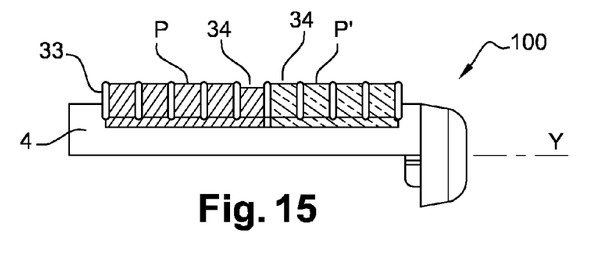
Figure 16:
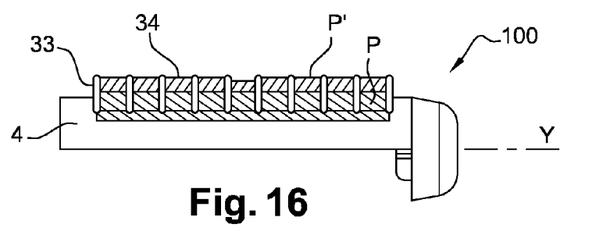

In alternative embodiments illustrated in FIGS. 15, 16 and 20, an application unit 100 can comprise several cosmetic products P, P'.

The different products are, for example, of different colours or exhibit different properties. The different products provided can, for example, result in makeups which are more or less full-bodied and which more or less lengthen.

Thus, as represented in FIG. 15, at least two compartments 34 comprise different cosmetic products. The support 4 of the application unit 100 comprises a frame with a row of compartments 34. A first proximal series of compartments 34, with respect to the base 2 of the applicator, comprises a first product P, for example of a first colour and/or exhibiting a specific threading nature. A second distal series of compartments 34, with respect to the base 2 of the applicator, comprises a second product P', for example of a second colour and/or exhibiting another threading nature. In this way, in the case of products to be applied to the eyelashes, the user can obtain a fringe of eyelashes with portions of two different colours and/or with an elongation of different lengths.

According to an alternative form represented in FIG. 16, at least one compartment 34 comprises two different cosmetic compositions P, P' stacked one above the other. The support 4 of the application unit 100 comprises a frame with a row of compartments 34. The bottom of the compartments 34 comprises a first product P. A second product P' is positioned on top of the first product P. In this way, the heating of the two products can bring about the melting thereof and makes it possible to obtain a mixture composed of the two products. Thus, it is possible to obtain an extemporaneous mixture of two products P, P' which are independently stable.

According to another alternative form represented in FIG. 20, in the case of a support 4 comprising two rows of compartments 34, each of these rows comprises a different cosmetic composition P, P'. For example, the first composition P can be a base for making up keratinous fibres or alternatively a composition for the cosmetic treatment of keratinous fibres, and the second composition P' can be a makeup for keratinous fibres or a composition to be applied to a mascara. Such compositions are described in particular in Application WO2009062947. In this way, the user can first apply the first product P for the preparation of the eyelashes and then the second product P' for making up the eyelashes.

The process for manufacturing and charging the support 4 with product P by injection moulding will now be described with reference to FIGS. 21 to 27. The term "injection moulding" is understood to mean moulding of a component by injection of a material in the fluid state under a pressure greater than atmospheric pressure into a closed volume apart from the injection orifice defined by the mould.

Figure 21:
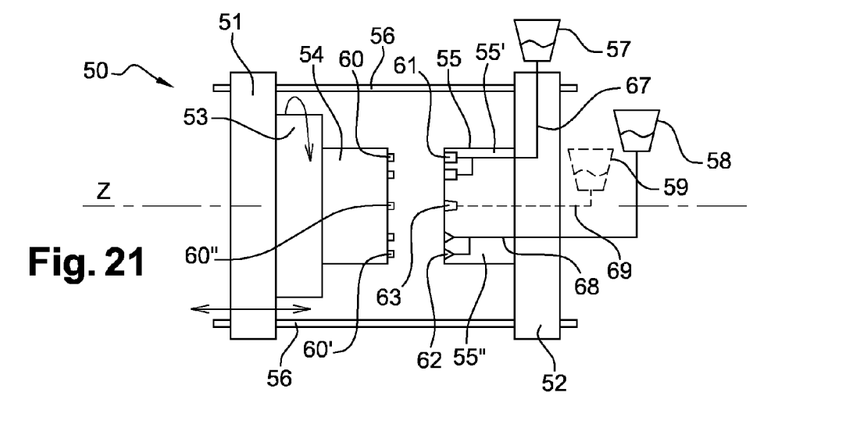

An injection moulding press 50 is represented diagrammatically in FIG. 21. The press 50 comprises a first plate 51 and a second plate 52 for fitting the half-moulds. The second plate 52 is fitted in stationary fashion with respect to a stand (not represented). The first plate 51 is fitted so that it can move in translation on slides 56 along a longitudinal axis Z. The two plates 51 and 52 extend transversely to the axis Z.

Actuating means (not represented), such as hydraulic jacks, for example, make possible the translatory movement of the first plate 51, in particular in the direction of the second plate 52. The thrust force of the means for actuating the first plate 51 against the second plate 52 for the purpose of closing the moulds is, for example, greater than 100 tonnes.

A first half-mould 54 is fitted to the first plate 51 via a platen 53 which pivots above the axis Z. A complementary mould 55 is fitted to the second plate 52. The complementary half-mould 55 can be formed by a second half-mould 55' and a third half-mould 55" which are independent. The second and third half-moulds 55, 55" are positioned so that, when the first plate 51 moves in translation in the direction of the second plate 52, the first half-mould 54 is facing and comes into contact with the second and third half-moulds 55', 55" for the closing of the moulds.

The first half-mould 54 comprises a first series of identical cavities 60. The term "a series of cavities" should be understood as meaning an identical cavity which can be repeated a certain number of times in order to create several identical components simultaneously. A series of cavities can thus comprise just one cavity which makes it possible to create just one component at the same time.

The second half-mould 55' comprises a second series of cavities 61 and the third half-mould 55" comprises a third series of cavities 62. The second and third series of cavities 61 and 62 are positioned so that the first series of cavities 60 is facing the second series of cavities 61 in a first angular position of the pivoting platen 53 and facing the third series of cavities 62 in a second angular position of the pivoting platen 53. For example, the two angular positions are situated at 180° from one another with respect to the axis Z but other angles are also possible.

The press 50 also comprises a first feed hopper 57 and a second feed hopper 58 respectively comprising the material for producing the support and the cosmetic product. These two materials are introduced at ambient temperature of approximately 20° C. into the hoppers, for example in the form of solid granules.

Each hopper is associated with a feed device (not represented) which makes it possible to convert the solid material of the hoppers into a fluid material and to transfer this fluid material under pressure to the feed lines 67, 68 respectively of the second and third series of cavities 61 and 62. For this, the feed device can comprise heating elements which make it possible to obtain a temperature of the material, for example, of greater than 50° C. for the cosmetic product or of greater than 100° C. for the thermoplastics, and means for pressurizing, such as an endless screw, which make it possible to inject the fluid material under pressure. The injection pressure of the material of the support 4 is, for example, greater than 500 bar. The injection pressure of the cosmetic product is, for example, greater than 10 bar, preferably between 15 bar and 20 bar, but can also be greater than 20 bar.

The feed lines 67, 68 are maintained at the injection temperature as far as the cavities of the mould in order to prevent the material from solidifying in the said lines.

The moulds also comprise cooling circuits (not represented), for example for cooling with water, which make it possible to lower the temperature of the cavities after injection of the material in order to cause the moulded components to solidify. After cooling, the temperature of the cavity is, for example, less than 40° C., indeed even less than 30° C.

The stages of the manufacturing process are as follows.

During a first stage, the first half-mould 54 is brought into contact with the second half-mould 55' by the translatory movement of the first fitting plate 51 in the direction of the second fitting plate 52. At this stage, a first injection volume is formed by the first and second cavities 60 and 61. The first injection volume defines the volume corresponding to the support 4.

Figure 22:
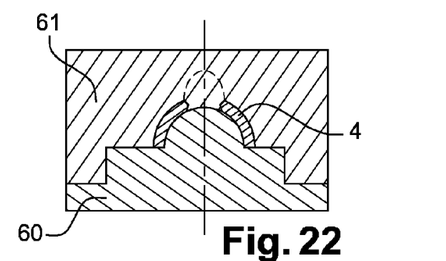
FIGS. 22 to 27 illustrate the various stages of the process for the manufacture of application units of the invention.
Figure 23:
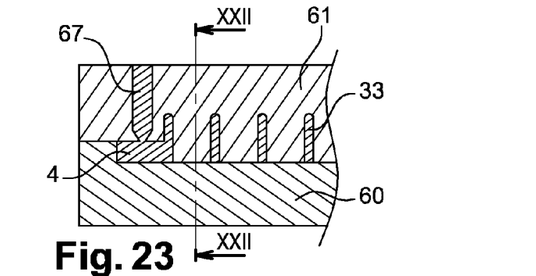

During a second stage illustrated in FIGS. 22 and 23, the material of the support 4 is injected via the injection line 67 into the first injection volume. The amount of material injected is less than 0.1 g, indeed even less than 0.05 g.

The single injection point of the support 4, at the end of the injection line 67, is, for example, situated at one end of the support, for example in the proximal part 31 or in the distal part 32 of the support 4. The injection can also be carried out via several different injection points.

The injection of the support 4 is carried out at a temperature of greater than 110° C., in order for the material of the support to be fluid. The injection temperature is, for example, greater than 130° C. if the material used for the support is ABS, SAN or PE, indeed even greater than 165° C. if the material used is PP or POM.

Once the injection is complete, the mould is subsequently cooled to a temperature of less than 100° C. in order for the support 4 to solidify.

Figure 24:
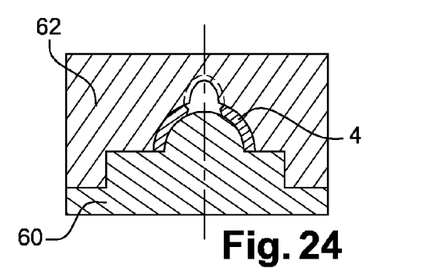
Figure 25:
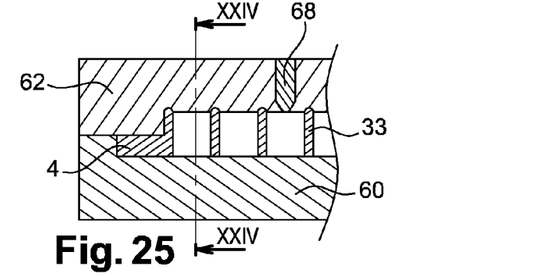

During a third stage illustrated in FIGS. 24 and 25, the mould is opened by the translatory movement of the first fitting plate 51 in the opposite direction to the second fitting plate 52.

The supports 4 are not ejected and remain positioned in the first series of cavities 60 of the first half-mould 54. The pivoting platen 53 then performs a rotation of 180° which makes it possible to position the first series of cavities 60, retaining the supports 4, facing the third series of cavities 62. The mould is subsequently reclosed by the translatory movement of the first fitting plate 51 towards the second fitting plate 52. At this stage, a second injection volume is formed by the first and third series of cavities 60 and 62.

Figure 26:
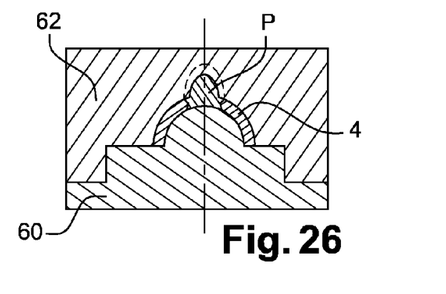
Figure 27:
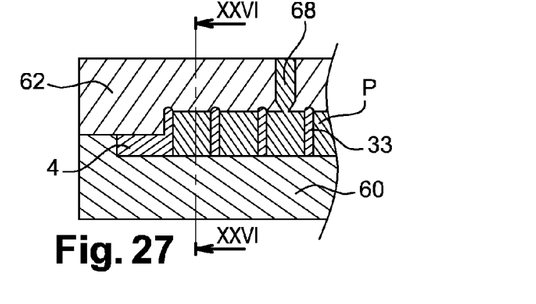

During the fourth stage illustrated in FIGS. 26 and 27, the cosmetic product P is injected onto the support 4 via the injection line 68 in the second injection volume.

The amount of cosmetic product injected is, for example, less than 1 g, indeed even less than 0.5 g, indeed even less than 0.1 g.

For example, each compartment can comprise approximately 0.05 g of cosmetic product.

The single injection point of the product P, at the end of the injection line 68, is, for example, situated in a compartment of the support 4. During injection of the cosmetic product P into a compartment 34, the product also spreads into the other compartments via the grooves 35.

Preferably, when the support comprises an odd number of compartments, the injection point lies in the central compartment. In this way, the stresses of the injection of the product P onto the support 4 are distributed symmetrically over the support.

The injection can also be carried out via several different injection points; for example the mould can exhibit an injection point per compartment of the support.

The injection of the product P is carried out at a temperature of greater than 50° C. in order for the cosmetic product to be fluid. It is important for the injection temperature of the cosmetic product to be lower than that of the support in order not to liquefy the support 4.

Once the injection of the cosmetic product is complete, the mould is cooled to a temperature of less than 40° C. in order for the cosmetic product P to solidify on the support 4 in order to adhere to the latter and thus to form an application unit 100.

During a fifth stage, the mould is opened by the translatory movement of the first fitting plate 51 in the opposite direction to the second fitting plate 52.

The application units 100 are ejected from the mould by ejection means (not represented). The pivot platen 53 then performs a rotation of 180° which makes it possible to position the first series of cavities 60 facing the second series of cavities 61, as in the starting position of the first stage.

The process then takes up the stages again, starting from the first, and so on.

In an alternative form, the first half-mould 53 can comprise a second first series of cavities 60' which are identical to the first series of cavities 60 and which are situated, in this example, symmetrically opposite, with respect to the axis Z, the first series of cavities 60, that is say offset by 180° with respect to the axis Z.

In this way, the same cycle as for the first series of cavities, offset by one injection, can be carried out simultaneously.

Thus, during the first stage, the second first series of cavities 60' forms, with the third series of cavities 62, a second injection volume for the injection of the cosmetic product. It should be noted that, apart from the first injection cycle, the second first series of cavities 60' comprises, at this stage, the support 4.

Likewise, during the fourth stage, the second first series of cavities 60' forms, with the second series of cavities 61, a first injection volume for the injection of the support.

This process advantageously makes it possible, on the one hand, to form the application units 100 on a single press, and, on the other hand, to be able to inject in parallel a support series and an application unit 100 series.

The same principle can be employed when the application unit 100 comprises several cosmetic products, for example application units comprising two cosmetic products, as illustrated in FIGS. 15, 16 and 20.

The first half-mould 54 then comprises an additional third first series of identical cavities 60", each first series of cavities 60, 60', 60" being, for example, offset with respect to one another by 120° in rotation, with respect to the axis Z.

The complementary half-mould 55 comprises a third series of cavities 63; the series of cavities of the complementary half-mould 55 are situated facing the first series of cavities 60, 60' and 60", so as to interact with the latter in order to form a complete mould.

The press 50 then comprises an additional feed hopper 59, associated with a feed device (not represented), connected to a feed line 69 to the third cavities 63.

An additional injection stage is then provided and the rotation of the pivoting platen 53 is carried out via a step of 120°.

The use of the injection process on the press described above can also be easily adapted by a person skilled in the art of injection to use on other types of injection moulding presses, such as, for example, pivoting multiface presses, as described in the documents US2002101005 or WO2004103676.

The supports 4, after the charging with product carried out by the process described with reference to FIGS. 21 to 27, can be sold in a packaging, for example a blister pack, comprising a plurality of application units 100, with or without applicator 1. In the case where an applicator 1 is provided in the packaging, an application unit 100 may be already attached to the applicator 1.

The application units can comprise the same or different products. The different products are, for example, of different colours or exhibit different properties. The different products provided can, for example, result in makeups which are more or less full-bodied and which more or less lengthen.

In particular, when the appearance of the products present on the corresponding supports does not allow the user to easily tell them apart, the supports can be produced with identifiers which make it possible to distinguish them. The supports can, for example, be produced with different colours, each colour being associated with a corresponding product. The user can thus choose the support with the colour corresponding to the product which she wishes to apply.

Different supports provided to the consumers can be packaged individually or, in an alternative form, in a common packaging. The supports can, for example, be provided in the form of strings, for example being bonded to one another via scored material bridges. This can facilitate the manufacture of the application units.

The applicator can be provided to the consumer with the base and several application units. The base can in particular be provided within the same packaging with several identical application units or with several application units carrying different products and the user can then choose an application unit according to the product which she wishes to use.

The user can also be provided, in particular within the same packaging, with application units charged or not charged with the same product but exhibiting different embossments, for example comprising more or fewer projecting application elements or ribs which are directed differently, in order, for example, to comb the eyelashes to varying degrees during application and to produce a makeup having varying degrees of body.

The invention is not limited to the examples illustrated. The characteristics of the different examples can in particular be combined within alternative forms not illustrated.

The expression "comprising a" should be understood as meaning "comprising at least one", unless otherwise specified.

The invention claimed is:

1. An application unit removably mountable to a separate applicator, the application unit comprising:
   a support; and
   a solid cosmetic product injection-molded to the support as a single integral unit, wherein the support comprises:
      a first portion comprising an internal face of the support, wherein the internal face is configured to be removably fixed to a reception region on an electrical heating element of the separate applicator; and
      a second portion integral with the first portion, the second portion comprising at least two receiving compartments for receiving the solid cosmetic product,
   wherein the at least two receiving compartments are positioned on an external face of the support opposite from the internal face and wherein the at least two receiving compartments are separated from one another by ribs extending substantially transversely to the support, and wherein a composition of the solid cosmetic product is different from that of a material of the support.

2. The application unit of claim 1, wherein a melting point of the solid cosmetic product is greater than 30° C. and lower than a melting point of the material forming the support, the melting point of the material forming the support being greater than 100° C.

3. The application unit of claim 1, wherein the second portion of the support comprises a plurality of receiving compartments and wherein a groove connects the plurality of receiving compartments.

4. The application unit of claim 3, wherein the groove is situated on the external face of the support or on the internal face of the support.

5. The application unit of claim 3, wherein a number of the plurality of receiving compartments is odd.

6. The application unit of claim 1, wherein the solid cosmetic product includes at least two cosmetic products.

7. The application unit of claim 6, wherein the second portion of the support comprises at least two compartments containing the at least two cosmetic products.

8. The application unit of claim 7, wherein the at least two cosmetic products are layered one above the other.

9. The application unit of claim 8, wherein the at least two cosmetic products differ from each other.

10. The application unit of claim 6, wherein the support comprises two rows of compartments and each of the rows comprises a different cosmetic product.

* * * * *